Aug. 24, 1965 R. W. McGILL 3,201,916
FLAP OPENER APPARATUS
Filed Oct. 30, 1961 5 Sheets-Sheet 1

INVENTOR.
ROBERT W. MCGILL
BY Oldham & Oldham
ATTYS.

Aug. 24, 1965　　　R. W. McGILL　　　3,201,916
FLAP OPENER APPARATUS
Filed Oct. 30, 1961　　　　　　　　　　5 Sheets-Sheet 2

*INVENTOR.*
ROBERT W. MCGILL
BY

ATTYS

INVENTOR.
ROBERT W. MCGILL
BY
ATTYS.

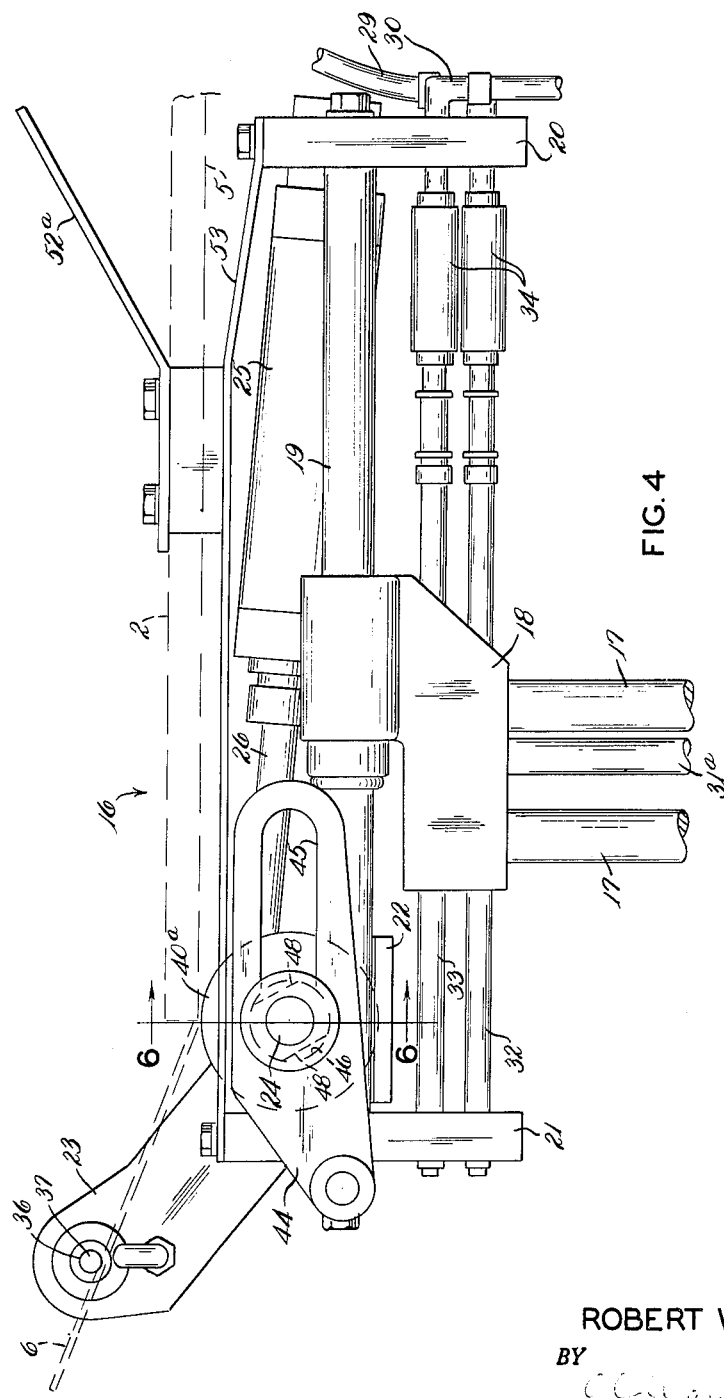

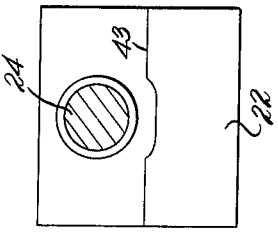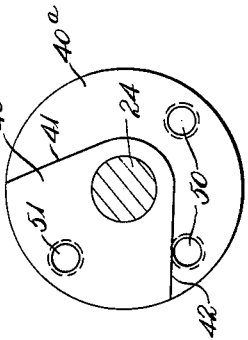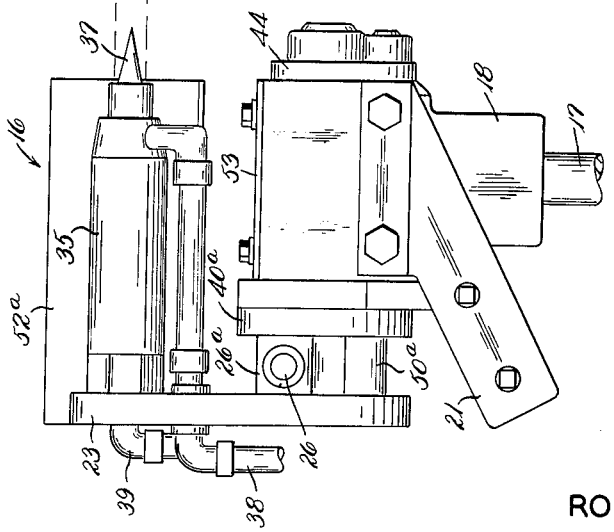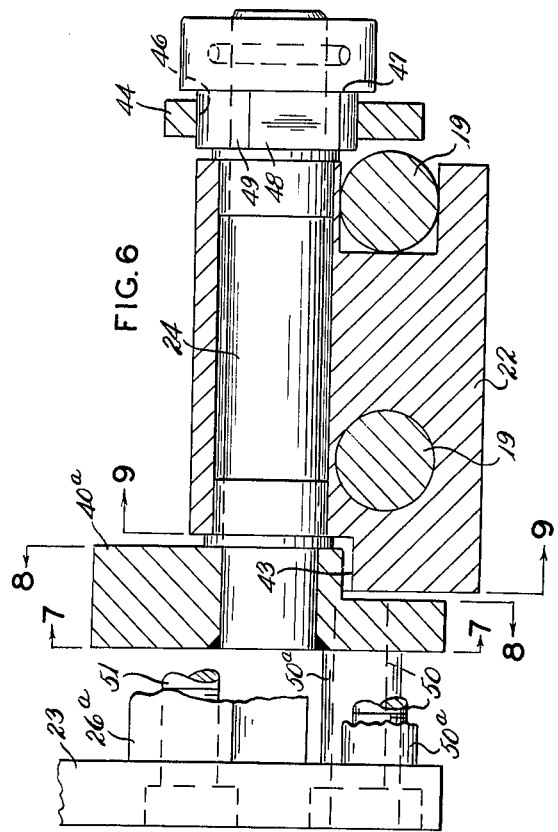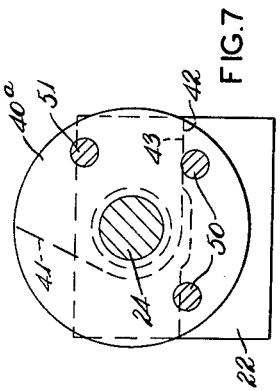

_United States Patent Office_  
3,201,916  
Patented Aug. 24, 1965

3,201,916  
FLAP OPENER APPARATUS  
Robert W. McGill, Akron, Ohio, assignor, by mesne assignments, to Geo. J. Meyer Manufacturing Co., Milwaukee, Wis., a corporation of Wisconsin  
Filed Oct. 30, 1961, Ser. No. 148,489  
11 Claims. (Cl. 53—382)

The present invention relates to flap opening apparatus, and specifically to apparatus for opening the leading or any one flap or end of a case, as such case is positioned for case filling action.

In the food and beverage industries today, very large quantities of packaged containers, or articles are processed every day. In many instances, it is desirable to package these articles, such as cans, bottles, jars, or the like, in cardboard boxes that have side flaps on opposed parallel edges thereof and a pair of opposed end flaps to cover the contents of the case after it has been filled. The filling of these cases is primarily done by some type of automatic processing machinery. Thus the empty cases are fed into the machine and are led through the machine in a controlled path. Usually the cases have their end and side flaps in closed position when the case is fed into the apparatus, and the apparatus may provide some type of conventional means, such as a plow, for engaging the side flaps and opening such side flaps to start to present the interior of the case for article reception. However, it is more difficult to pull the closed leading end flap forwardly of the case as it is moving along, or positioned in the apparatus. The trailing end flap of a case usually can be opened by any of a variety of means so as to pull such end flap out of the open top of the case prior to article deposit.

Some types of leading end flap opening means or apparatus have been provided heretofore, but, insofar as I am aware, no completely satisfactory flap opener has been developed for all case filling apparatus. The apparatus as used heretofore may have been too complicated, or it may have not functioned rapidly enough for many case filling actions, or the prior apparatus may be objectionable for other reasons, such as being noisy, bumpy, by requiring a great deal of maintenance thereon, etc.

The general object of the present invention is to provide a novel and improved flap opening apparatus of the class described and where such flap opening apparatus is characterized by the rapid, sequence controlled, positive acting flap opening action obtained.

Another object is to provide a flap opening apparatus that is readily attachable to article or case filling apparatus of previous construction.

Another object of the invention is to provide a leading end flap opener case filling apparatus and where such end flap opening means may include a pivotally positioned arm carried on a slidable block positioned on the apparatus whereby the pivotally positioned arm, which has a plunger thereon extendable to engage an end flap, can be swung through an arc for end flap opening action.

Another object of the invention is to provide end flap opening apparatus of the class described where cushion means are provided in the apparatus to reduce impact and jars in the apparatus when a control member therein is moved to extreme positions, and where a slide member is locked in the apparatus at one end of its slide movement while other flap opening actions occur in the apparatus.

Another object of the invention is to provide flap opening apparatus of the class described and where the apparatus is made from a minimum of moving parts and where the apparatus is sturdily built and constructed to have a long service life with a minimum of maintenance and to have a sufficiently rapid rate of cyclic operation as to be used with case filling apparatus processing as many as about 30 cases per minute.

The foregoing and other objects and advantages of the present invention will be made more apparent as the specification proceeds.

Attention now is particularly directed to the accompanying drawings, where:

FIG. 4 is a rear, or back elevation of the flap opening apparatus of the invention;

FIG. 5 is a fragmentary end elevation of the flap opening means of the invention;

FIG. 6 is an enlarged fragmentary vertical section taken on line 6—6 of FIG. 4;

FIG. 7 is a fragmentary vertical section taken on line 7—7 of FIG. 6;

FIG. 8 is a vertical section taken on line 8—8 of FIG. 6 to show the control cam or member for limiting arcuate movement of the flap opening arm;

FIG. 9 is a fragmentary vertical section taken on line 9—9 of FIG. 6; and

When referring to corresponding members shown in the drawings and referred to in the specification, corresponding numerals are used to facilitate comparison therebetween.

Figure 1:
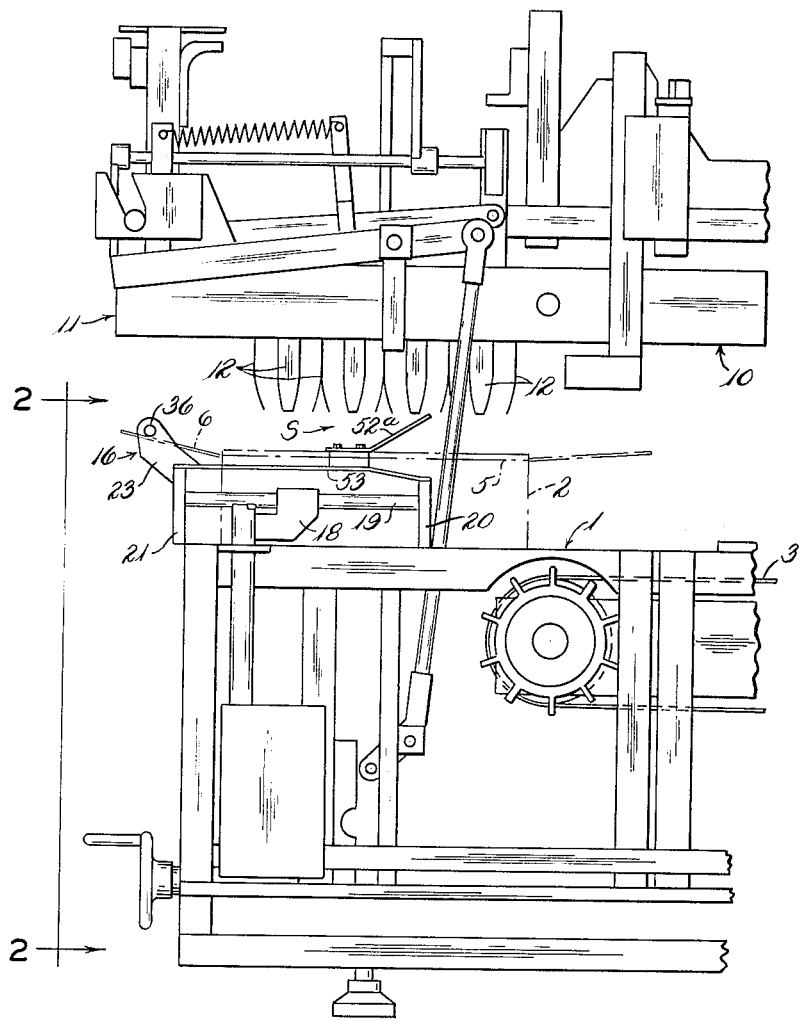
FIG. 1 is a fragmentary elevation of case packing apparatus having an end flap opening means embodying the principles of the invention associated therewith.

In general, the present apparatus is used in combination with a case packer or the like that deposits articles into a positioned cardboard case with a closed leading end flap thereon hingedly connected to the case, and the novel apparatus includes a guide means operatively positioned adjacent a positioned case and parallel to the axis thereof, flap opening means carried by the guide means and movable therealong parallel to the axis of the positioned case, which flap opening means has a portion engageable under a closed end flap, means operatively controlling the flap opening means and moving it to insert it under a closed end flap and then moving the flap opening means arcuately towards the flap hinge to swing the flap through a forward arc to open the closed end flap, and lock means engaging the last-named means to prevent forward arcuate movement of the flap opening means until the flap opening means reach an extreme position on the guide means. The present apparatus is particularly adapted for use with article or case packing apparatus as disclosed in pending U.S. patent application Serial No. 846,683, entitled Bottle Caser Apparatus, filed October 15, 1959, by Bruce G. Copping.

*Case packer apparatus*

Reference is now made to the details of the construction shown in the drawings, and a portion of a case packer apparatus, as specifically described and disclosed in said co-pending application, is shown. This apparatus includes a frame 1 along which a plurality of cardboard cases, or equivalent cases or boxes or the like 2, are adapted to be fed by a conveyor 3 until they reach a case filling station indicated at S in the drawings adjacent an end of the frame 1. Any suitable means, not shown, may be associated with the conveyor 3 for plowing, or otherwise opening the side flaps 4 and 5 of the case and with the leading end flap 6 of the case as moved along the conveyor normally being in a closed position when it reaches the station S. This end flap 6 is hingedly connected to the remainder of the case 2, and because of the natural resiliency in the material from which the case 2 is made and in the fold of the end flap, normally this closed leading end flap 6 does extend upwardly at a slight angle so that its free end is positioned slightly above the adjacent vertical margins of the side portions of the case. At the case filling station S, a support platform or plate 7 is provided onto which the case 2 is deposited, and this support platform 7 is controlled by a suitable member, such as a lift cylinder 8, that has a piston rod or ram 9 extending therefrom and positioning the support platform 7.

The case filling apparatus with which the apparatus of the invention is used (FIG. 1) also includes an upper frame section 10 onto which a plurality of articles, such as filled bottles, cans, or the like, can be led into a grid or case filling assembly section 11 from which the articles can be dropped through a plurality of spring fingers 12 to be received in one of the cases 2 when on the support platform 7. The actual article dropping operation may be performed, for example, by raising the support platform 7 and the case thereon up to a position immediately below the fingers 12 at which time articles will be dropped down into the case to fill it, after such articles have been arranged in proper case filling positions on the grid 11 in any conventional manner.

The support platform 7 may be reinforced in its positioning and movement by a pair of laterally extending ears, or support plates 13 and 14 that engage suitable members, such as vertically extending slides 15 on the frame 7 so that the plates 13 and 14 and slides 15 aid in maintaining the support platform 7 centered for reciprocating movement with the piston rod 9 and the means carried thereby.

*Flap opening apparatus*

Figure 2:
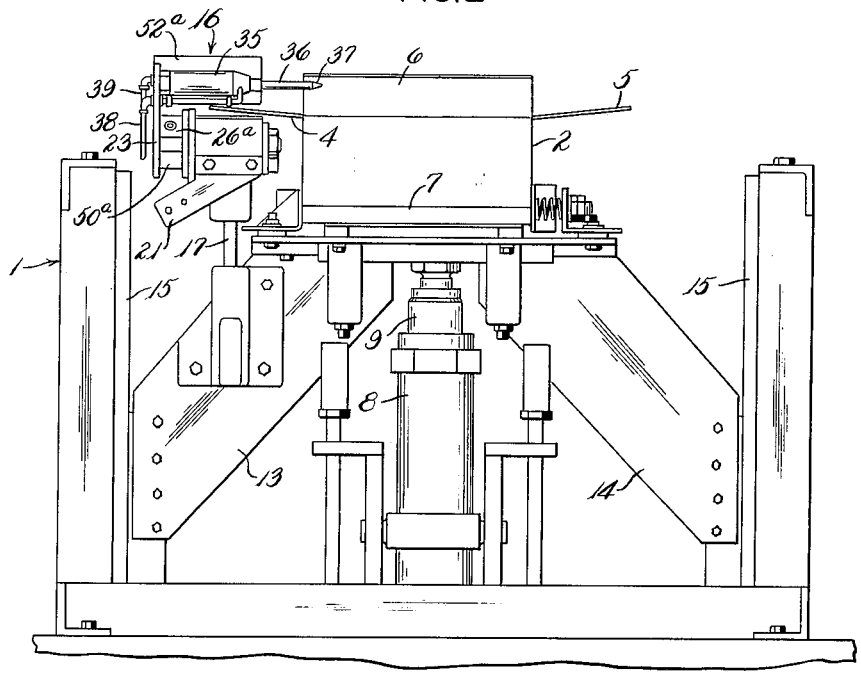
FIG. 2 is a fragmentary enlarged end elevation taken on line 2—2 of FIG. 1.
Figure 3:
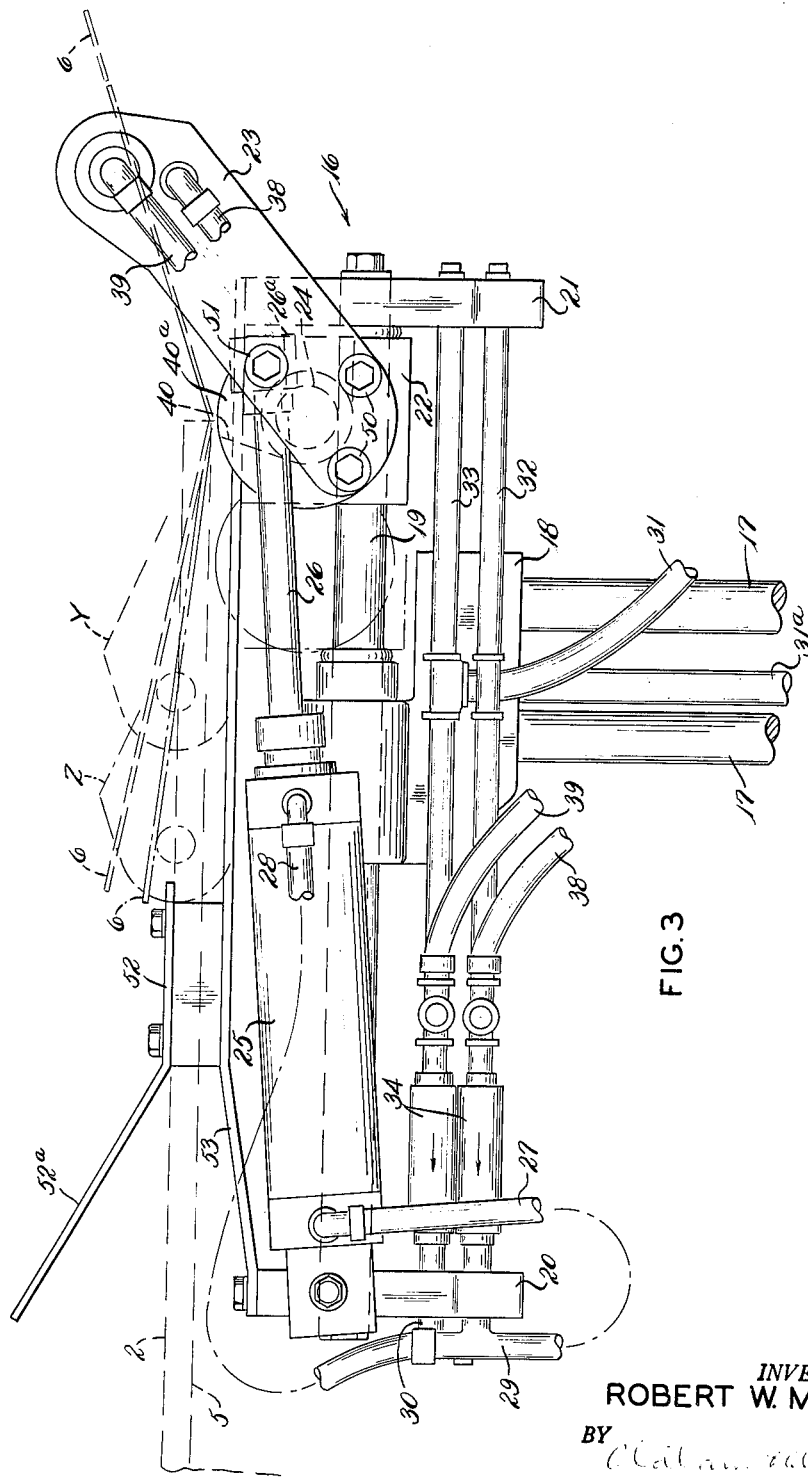
FIG. 3 is an enlarged fragmentary elevation of the flap opening apparatus embodying the principles of the present invention and shown with its cover removed.

The actual flap opening apparatus of the invention is indicated as a whole by the numeral 16 and it is positioned under a cover 116 in FIG. 1. FIGS. 2 and 3 show that the flap opening apparatus 16 includes a pair of support rods 17, 17 that are secured, for example, to the plate 13 for vertical movement of the flap opening apparatus with the support platform 7 as the case filling action is to be obtained. The support arms 17, 17 engage with a suitable member, such as a frame or carrier block 18, at their upper ends, which frame or carrier block has guide rods 19, 19 suitably secured thereto and extending axially therefrom in both directions. Such guides 19, 19 are parallel to the longitudinal axis of the positioned case 2 at the station S, but are offset from such case adjacent the leading end thereof. The guides 19 preferably have support plates 20 and 21 secured to the ends thereof to form a support for other portions of the flap opening apparatus 16. These guides 19, 19 also have a slide member, or block 22 slidably engaged therewith for movement intermediate one end of the frame block 18 and the support plate 21 thereadjacent. The slide member has an arm 23 pivotally secured thereto by a shaft 24 so that the arm 23 has pivotal movement in a plane parallel to but offset from the longitudinal axis of the positioned case at the case filling station.

*Control of slide member movement*

Movement of the slide block 22 is provided, for example, by a double acting cylinder 25 secured to the support plate 20. The cylinder 25 has a piston (not shown) therein connecting to a piston rod 26 that extends therefrom and connects to the slide block 22. The action of the piston in the cylinder 25 is controlled by the supply of suitable pressure means thereto, for example, air, through a pair of conduits 27 and 28 that connects to opposite ends of the cylinder 25. The conduit 27 connects to an air supply line 29 while the conduit 28 connects to an air supply line 30, respectively. Air or similar fluid under pressure is supplied to these lines 29 and 30 by air supply means 31 and 31a connecting to conduits 32 and 33, respectively. The conduits 32 and 33 connect to the tubes 29 and 30, which tubes are suitably secured to and extend between the support plates 20 and 21 to form a sturdy, operative apparatus assembly. The conduits 32 and 33 have suitable known adjustable valve members 34 therein which may be adjustable orifice control valves or air checks to provide a slow release of air therethrough in one direction and free flow of air therethrough in the other direction for supply of pressure to the conduits 27 and 28 for an action to be hereinafter described in more detail. The air cylinder 25 has a conventional air cushion means (not shown) built therein to provide a slow release of air being discharged from the cylinder 25 by movement of the piston therein when the piston rod 26 is being extended so that the initial movement of the piston rod may be quite rapid even with the action of the valves 34, but with some cushioning action on the final phase of movement of the rod being obtained as the piston in the cylinder approaches its extreme position therein. The adjustable valves 34 preferably are connected in the exhaust conduits for air flow from the cylinder 25 for controlled air flow and to permit pressure flow readily in the directions indicated.

As a particular important feature of the invention, the arm 23 carries members thereon and has controlled movement by which the leading end flap 6 of a case 2 can be opened in a rapid, automatic manner. To this end, the arm 23 has a double acting cylinder 35 secured thereto and extending substantially normally therefrom. This cylinder 35 has a plunger 36 received therein and having an operative extended position, as indicated in dotted lines in FIG. 5, and having a retracted position, as shown in solid lines. The plunger 36 preferably has a pointed end 37 to facilitate the plunger sliding in under a leading end flap 6 to aid in raising it vertically upwardly to swing it about its hinge on the case, as hereinafter described.

FIG. 2 brings out the fact how the plunger 36, when extended, will be operatively engaged with and overlap the leading end flap 6 of the case. The actual reciprocation of the plunger 36 is obtained by pressure means from tubes 38 and 39 which connect the opposite ends of the cylinder 35 to the conduits 32 and 33. Hence when air pressure is supplied to the conduit 27, the tube 38 will have air pressure supplied thereto to cause the plunger 36 to move to its extended, operative position, and with the tube 39, when energized concurrently with the conduit 28 for return movement of the slide member 22, causing the plunger 36 to be returned to its retracted, inoperative position.

The action of the arm 23 is shown in FIG. 3 where the retracted upstream directed positioning of the arm 23 is indicated in dotted lines at Z, whereas the upstream position of the arm 23 at its operative, or other extremity of movement with the slide member 22, is indicated in dotted lines at Y, in FIG. 3. The fully operative downstream inclined, or directed position of the arm 23 is shown in solid lines in FIG. 3. The arm 23 is provided with limited arcuate movement by means of a substantially V-shaped stop 40, which has shoulders 41 and 42 provided thereon, formed on a control disc 40a. The disc 40a is carried by the shaft 24 and is adapted to rotate with reference to a horizontally directed shoulder 43 formed on one lateral margin of the slide member 22. Thus the shoulder 41 will engage the shoulder 43 at the retracted position for the arm 22, as indicated at Z, whereas the other stop shoulder 42 will engage the shoulder 43 when the arm has been moved to its opposite extreme position facing upstream in the apparatus, as indicated in solid lines in FIG. 3.

As the one piston rod 26 controls the position of the slide member 22 on the guides 19, 19 and also functions to pivot the arm 23 on the shaft 24, another feature of the invention resides in providing a lock plate 44, FIG. 4, in operative association with the shaft 24 at the end thereof remote from that engaging the arm 23. Such lock plate 44 has a keyhole shape slot 45 provided therein that has an enlarged head or end 46 formed therein. A guide block 47 is provided on and secured to the shaft 24 and has a pair of parallel, outwardly facing surfaces 48, 48 formed thereon to be slidably engaged with the slot 45 for the uniform width portion thereof. However, the surfaces 48, 48 terminate in arcuately shaped segments or sections 49 which will rotatably engage the slot end 46. Thus, by observing the relationship of the control disc 40a with relation to the shoulder 43 formed on the slide member 22, it will be seen that the piston rod 26 is continually urging the shaft 24 to turn in an arcuate direction for pivotal movement of the arm 23 to its downstream inclination or positioning.

It will be noted that the control disc 40a is secured to the control arm 23 by a pair of cap screws 50, 50 or the like adjacent the lower end of the arm, that extend through spacer sleeves 50a, 50a to space the arm and disc from each other. The control disc 40a also is secured to the end of the piston rod 26 by a suitable cap screw or bolt 51 which extends through a bushing or spacer sleeve in a clevis, or block, 26a secured to the piston rod 26 to engage the arm 23.

Figure 10:
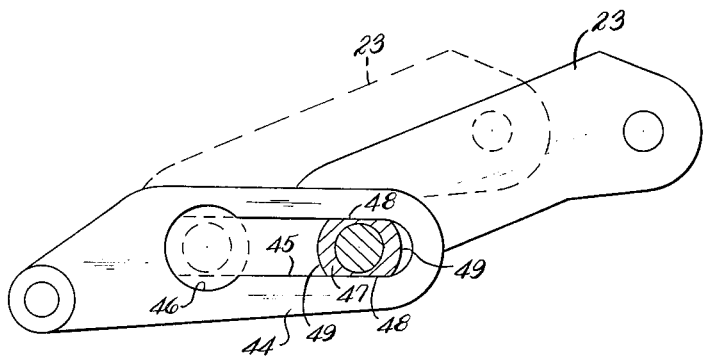
FIGS. 10 and 11 are partial side views showing the arm and guide block shown in FIG. 4.
Figure 11:
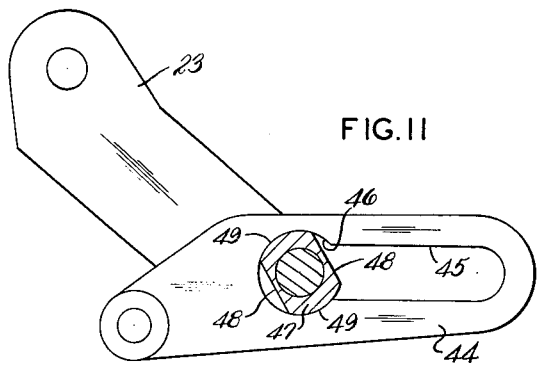

FIGS. 10 and 11 best show how this guide block 47 will slide along in the slot 45 for the initial sliding movement of the slide member 22 on the guides 19, 19 but how the ultimate pivotal or arcuate movement of the arm 23 can be produced only at the end of movement of the slide member 22 on its limited axial path on these guides 19 because of the lock means and the relative engagement of the arm 23 and the control disc 40a.

It will be seen that the action of the flap opening apparatus 16 of the invention must be relatively rapid, as it may be used with a case filling apparatus that, for example, may be filling 30 cases per minute. Naturally the action of the flap opening apparatus 16 must be such as to present the case 2 for filling action through the grid 11 at an early portion of each operative cycle before articles are ready for drop through the grid. To this end, the entire movement of the slide member 22 on the guides and the pivotal movement of the arm 23 from a downstream inclination to an upstream inclination should occur in about between .2 and .3 of a second. Next the apparatus might have a dwell of, for example, about .3 second and then the arm 23 and the slide member 22 may both be returned to the inoperative positions in, for example, approximately 1½ seconds while the case filling action is occurring and a new case is being received on the support platform 7.

FIGS. 1 and 3 of the drawings best show that the flap opening apparatus 16 of the invention also has associated with it some suitable member, such as a guide flap or plate 52, having an upwardly inclined end 52a, which is suitably secured to a companion guide plate 53 for case side flap guide action. The guide plate 53 is operatively associated with and carried by the support plates 20 and 21. The guide plates 52 and 53 are so positioned that, as the case 2 is moved into the case filling station S by the conveyor 3 of the apparatus, the side flap 4 of the case will be engaged by the upwardly inclined section 52a of the guide plate 52 and lead such edge flap into a substantially horizontal position intermediate these plates 52 and 53. Such action facilitates positioning the carrier arm 23 and the cylinder and plunger 37 extending therefrom to extend in above but adjacent the side upper margin of the case for convenient engagement with the leading end flap.

It will be realized that the air supply through the tubes or conduits 31 and 31a is so regulated and controlled by timer means as to occur in proper timed relationship to the operation of the remainder of the apparatus with which the flap opening means is associated. Hence, a control timer disc, or plate (not shown) can be provided on the apparatus drive shaft, or control shaft in the same manner as the control cams or discs shown in the above-identified co-pending application of Bruce G. Copping showing more details of the apparatus with which the apparatus of the present invention is associated when operatively positioned.

By the present apparatus, it is believed that a new and improved type of a case flap opening action has been provided and that this case flap opening action is positively obtained by a controlled operation in proper sequence in the case filling action. The plunger 36 may engage under a case flap when initially extended, or when moved along on the slide block 22. The apparatus can function effectively over a long service life and provide excellent results with no damage to any of the cases being processed, or filled in the apparatus of the invention. It is in the scope of the invention to cushion the final movement of the piston in the cylinder 25 in both directions. Obviously the flap opening apparatus can be adapted for use with cases of various sizes for receiving any type of articles, bottles, or other containers, as desired. Hence it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

I claim:

1. Flap opening apparatus for combination and use with means for positioning a cardboard case with a leading end flap thereon in a relatively fixed position and comprising
   frame means positioned adjacent the relatively fixed position for a case,
   a guide member operatively carried by said frame means and positioned parallel to the longitudinal axis of a case,
   a slide member operatively carried by said guide member for limited axial movement on the frame means,
   an arm pivotally carried by said slide member for movement parallel to the longitudinal axis of a case and having limited arcuate movement parallel to said case axis,
   a double acting cylinder carried by said arm and having a plunger with an extended and a retracted position,
   said cylinder extending normal to the longitudinal axis of said arm and being positioned to have said plunger engage in under the closed leading end flap of a positioned case when said plunger is extended in one extreme position of said arm,
   a second double acting cylinder having a controlled piston rod operatively carried by said frame and operatively engaging said arm by said piston rod to move said arm axially of said frame on said slide member and to move said arm pivotally from its said one position to its other extreme position and to swing said case flap to an open position by such movement, and
   means operatively engaging said arm to prevent pivotal movement thereof until said slide member at least approaches a limit of movement away from said second named cylinder.

2. Flap opening apparatus for combination and use with means for positioning a cardboard case with a closed leading end flap and open side flaps thereon, which apparatus comprises
   frame means adjacent the positioned case,
   a guide member operatively carried by said frame means and positioned parallel to the longitudinal axis of a case,
   a slide member operatively carried by said guide member for limited movement thereon adjacent the leading end of a positioned case,
   an arm pivotally carried by said slide member for movement parallel to the longitudinal axis of a case and having limited arcuate movement on the arm axis from an upstream inclined to a downstream inclined position, a double acting cylinder carried on said arm and having a plunger with an extended and a retracted position, said cylinder extending substantially normally to the longitudinal axis of said arm and being positioned to have said plunger engage in under the closed leading end flap of a positioned case when said plunger is extended in the upstream position of said arm, a second double acting cylinder having a controlled piston rod operatively engaging said arm to move said arm axially of said frame on said slide member, and to move said arm pivotally from its upstream to its downstream inclined position and to swing said case flap to an open position, and means operatively engaging said arm to prevent pivotal movement thereof until said slide member at least approaches a limit of movement away from said second named cylinder.

3. In combination with a case packer or the like that deposits articles into a stationarily positioned cardboard case with a closed leading end flap thereon hingedly connecting to the case, a stationary guide means operatively positioned adjacent a positioned case, flap opening means carried by said guide means and movable therealong parallel to the axis of a positioned case, said flap opening means having a portion positioned on and movable along an axis extending perpendicular to the longitudinal axis of the case and engageable under a closed end flap, fluid actuated means operatively engaging and controlling said flap opening means to insert it by straight line movement under a closed end flap and to move said flap opening means towards the flap hinge and to swing such means through a forward arc to open such closed end flap, and lock means engaging said last-named means to prevent forward arcuate movement of said flap opening means until said flap opening means reaches an extreme position on said guide means.

4. In combination with a case packer or the like that deposits articles into a stationary cardboard case with a leading end flap thereon hingedly connecting to the case and where cases are fed to a filling position through a controlled path with their side flaps open, a stationary guide means operatively positioned parallel to and adjacent a case having a closed leading end flap, flap opening means positioned adjacent said guide means and having a portion adapted for horizontal movement to be engageable under a closed end flap, and means operatively engaging and controlling said flap opening means to insert it under a closed end flap and to move said flap opening means towards the flap hinge and to swing such means through a forward arc to open such closed end flap.

5. In combination with a case packer or the like that deposits articles into a cardboard case initially having a closed leading end flap thereon hingedly connecting to the case at a case filling station, a guide means operatively positioned parallel to and adjacent a case having a closed leading end flap at the case filling station, flap opening means carried by said guide means for relative movement therealong, said flap opening means having a controllable portion positioned for straight line movement to engage under a closed end flap, and means operatively engaging and controlling said flap opening means to insert said portion under a closed end flap and to move said flap opening means through a forward arc to open such closed end flap.

6. Apparatus for use with a case packer or the like that deposits articles into a cardboard case with a closed leading end flap thereon hingedly connecting to the case, and comprising a guide means for operatively positioning parallel to and adjacent a case having a closed leading end flap, flap opening means including an arm carried by said guide means and movable therealong, said flap opening means having a retractable member on said arm engageable under a closed end flap, piston rod and cylinder means operatively engaging and controlling said arm of said flap opening means to insert said member under a closed end flap and to move said flap opening means towards the flap hinge and to swing such means through a forward arc to open such closed end flap, and lock means operatively engaging said piston rod and cylinder means to prevent forward arcuate movement of said flap opening means until it reaches an extreme forward position on said guide means.

7. Apparatus for use with a case packer or the like that deposits articles into a cardboard case with a closed leading end flap thereon hingedly connecting to the case, and comprising a frame, elongate guide means carried by said frame for positioning parallel to and adjacent a case having a closed leading end flap, an arm operatively carried by said guide means for movement therealong and pivotal with relation thereto, a controllable extensible and retractable member on said arm engageable under a closed end flap, piston rod and cylinder means operatively engaging and controlling said arm to move said flap opening means towards the flap hinge and to swing said arm through a forward arc to open such closed end flap, and lock means operatively engaging said piston rod and cylinder means to prevent forward arcuate movement of said arm until it reaches an extreme forward position on said guide means.

8. Apparatus for use with a case packer or the like that deposits articles into a cardboard case with a closed leading end flap thereon hingedly connecting to the case, and comprising a guide means adapted to be operatively positioned parallel to and adjacent a case having a closed leading end flap, flap opening means including an arm carried by said guide means and movable therealong, said flap opening means having a retractable member on said arm engageable under a closed end flap, piston rod and cylinder means operatively engaging and controlling said arm of said flap opening means to insert said member under a closed end flap and to move said flap opening means towards the flap hinge and to swing such means through a forward arc to open such closed end flap, piston rod and cylinder means operatively engaging and controlling said arm of said flap opening means to insert said member under a closed end flap and to move said flap opening means towards the flap hinge and to swing such means through a forward arc to open such closed end flap, a control disc operatively secured to said arm, and arcuate movement limitation means operatively associated with said control disc, said piston rod being connected to said arm through said control disc to move said flap opening means on said guide means and then to move said arm through a controlled arc.

9. Apparatus as in claim 6 where said arm has a control disc operatively secured thereto, said control disc forming a part of said lock means, said piston rod being connected to said arm through said disc to move said flap opening means on said guide means and then to move said arm through an arc.

10. Apparatus for use with a case packer or the like that deposits articles into a cardboard case with a closed end flap thereon hingedly connecting to the case, and comprising a guide means for operatively positioning parallel to and adjacent a case having a closed end flap, flap opening means including an arm reciprocably carried by said guide means for movement towards and away from the end flap hinge, and an extensible and retractable member on said arm engageable under a closed end flap in its extended position, fluid actuated means operatively engaging and controlling sad member to extend it and insert it under a closed end flap, means engaging said flap opening means to move it towards the flap hinge and to swing said arm through an arc to open such closed end flap, and lock means operatively connecting said guide means and said arm to prevent arcuate movement of said arm until it reaches its extreme position on said guide means adjacent the flap hinge.

11. In combination with a case packer or the like that deposits articles into a cardboard case, initially having open side flaps and a closed end flap thereon hingedly connecting to the case, at a case filling station, a guide means operatively positioned parallel to the longitudinal axis of and adjacent a case having a closed end flap at the case filling station, flap opening means carried by said guide means for relative movement therealong towards and from the end flap hinge, said flap opening means including a controllably extensible member positioned for movement towards and away from the case and engageable under a closed end flap, and means operatively engaging and controlling said flap opening means to insert said member under a closed end flap, to move said flap opening means towards the end flap hinge, and to move said flap opening means through an arc towards the end flap hinge to open such closed end flap.

References Cited by the Examiner

UNITED STATES PATENTS

| | | | |
|---|---|---|---|
| 2,637,958 | 5/53 | Lippmann et al. | 53—381 X |
| 2,761,263 | 9/56 | Bruce | 53—382 |
| 2,890,560 | 6/59 | Nigrelli et al. | 53—382 |
| 2,918,773 | 12/59 | Krupp et al. | 53—382 |

FRANK E. BAILEY, *Primary Examiner.*

ROBERT A. LEIGHEY, *Examiner.*